UNITED STATES PATENT OFFICE.

JACOB R. GREENE, JR., OF WASHINGTON, PENNSYLVANIA, ASSIGNOR, BY DIRECT AND MESNE ASSIGNMENTS, OF ONE-SIXTH TO EUGENE VEZIE AND ONE-THIRD TO JOHN WINSOR, OF WASHINGTON, PENNSYLVANIA, AND ONE-SIXTH TO CHARLES R. BALLARD, OF MIDWAY, PENNSYLVANIA.

BOILER-CLEANING COMPOUND.

No. 824,112.     Specification of Letters Patent.     Patented June 26, 1906.

Application filed June 8, 1905. Serial No. 264,360.

*To all whom it may concern:*

Be it known that I, JACOB R. GREENE, Jr., a resident of Washington, in the county of Washington and State of Pennsylvania, have invented a new and useful Improvement in Boiler-Cleansing Compounds; and I do hereby declare the following to be a full, clear, and exact description thereof.

This invention relates to a compound or composition for removing and preventing incrustations in steam-boilers and the like.

It is well known that the water in many portions of the country contains minerals and other impurities in solution or suspension and which become precipitated or deposited on the heated surface of the flues or water-tubes of boilers. In many cases these incrustations become so thick as to seriously affect the steaming qualities of the boiler. These incrustations practically form heat-insulating coatings on the flues or tubes. When the incrustations have been once formed, they are difficult of removal, being of a hard stony composition and if allowed to accumulate sometimes become of abnormal thickness. Many attempts have been made to prevent these difficulties, such as by purifying the water prior to introducing it to the boiler or by treating the boiler with acids or alkalies according to the character of water used. None of these schemes, so far as I am aware, has been entirely successful. I have discovered that these incrustations can be entirely prevented or, if formed, can be removed by the solvent properties of the juices of various vegetables. Ordinary coffee, for instance, contains an active element which will effectively prevent the formation of any incrustation, no matter how impure the water may be, or if once formed will remove the same. I believe the active ingredient performing this function is the caffein of the coffee, and substantially a similar active ingredient is the thein of tea, and similar ingredients are also found in several other vegetables or herbs, such as the guaranin of *Paulinia sorbilis* and the alkaloid of *Ilex Paragnaiensis*. The active property of these is probably an alkaloid; but as to this there may be differences of opinion. All of these I consider to be the equivalent of the active property of coffee and to be included in the claims under the term "coffee." I have discovered, however, that the active ingredients of these vegetable matters will effectively remove or prevent the formation of the incrustations. In order to some extent to neutralize the acids found in the water of many localities, I prefer to use also small quantities of other vegetables, such as the ordinary balsam-weed or sweet balsam (*Gnaphalium decurrens* and *Gnaphalium polycephelon*) or yarrow, (*Achilleo millifalium*,) both native in the eastern part of the United States, or both. With both of these herbs all parts of the plant can be used, stem, leaves, flowers, and fruit, the active ingredient thereof being contained in the juices. These several vegetable matters can be used in various proportions; but I prefer to use substantially ten pounds of coffee, one ounce of balsam, and one ounce of yarrow. The coffee will be used, preferably, in the unroasted form—that is, the green bean. All of these ingredients will be crushed or pulverized and can either be boiled and the liquor therefrom introduced into the boiler to be cleaned; but preferably the composition will be inclosed in a cloth bag, which in turn may be surrounded by metallic screening and then introduced into the boiler, where it will remain and the active ingredients be boiled out of the same. By keeping the composition in a mass the active ingredients will be leached out slowly, so that the efficiency of the composition will extend through a considerable period. The degree of fineness of the several ingredients will depend upon the conditions to be met. For instance, if a boiler is very much incrusted it is preferable to have the ingredients quite fine, so that the active principles thereof will be more quickly diffused, whereas, with a new boiler or one which has been cleaned it is desirable to have the material in a coarser form, so that the active ingredients thereof will not be diffused so rapidly. In order to clean an incrusted boiler, the composition will have to be renewed at short intervals, whereas with a clean or a new boiler it will suffice if introduced at intervals of about one month.

In order to some extent prevent the formation of an incrustation on a new or clean boiler, I prefer to introduce into the same a small quantity of graphite, which will form a smooth thin coating on the surface of the tubes or flues. This graphite can be conveniently introduced in powdered form with the remainder of the composition. I find that one ounce of graphite added to the proportions of ingredients above given answers the purpose. The effect is that the boiler flues or tubes are kept clean from incrustation and have a smooth coating of graphite on the surface thereof, so that the ready deposit of further incrustation is prevented.

What I claim is—

1. A composition for preventing and removing incrustations in boilers, having coffee as its principal ingredient, and also containing balsam-weed.

2. A composition for preventing and removing incrustations in boilers consisting of coffee, balsam-weed, and pulverized graphite.

3. A composition for preventing and removing incrustations in boilers, consisting of coffee, balsam-weed, yarrow, and pulverized graphite.

4. A composition for preventing and removing incrustations in boilers, consisting of green coffee, balsam-weed, yarrow and graphite, in substantially the proportions specified.

In testimony whereof I, the said JACOB R. GREENE, Jr., have hereunto set my hand.

JACOB R. GREENE, JR.

Witnesses:
   G. H. RANKIN,
   F. W. WINTER.